(12) United States Patent
Song et al.

(10) Patent No.: US 7,288,862 B2
(45) Date of Patent: Oct. 30, 2007

(54) RECIPROCATING MOTOR

(75) Inventors: Gye-Young Song, Gyeonggi-Do (KR);
Jong-Koo Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 233 days.

(21) Appl. No.: 11/023,541

(22) Filed: Dec. 29, 2004

(65) Prior Publication Data
US 2005/0140218 A1 Jun. 30, 2005

(30) Foreign Application Priority Data
Dec. 30, 2003 (KR) ............... 10-2003-0100720

(51) Int. Cl.
*H02K 33/00* (2006.01)

(52) U.S. Cl. .......................... 310/15; 310/12

(58) Field of Classification Search .......... 310/156.38, 310/156.39, 156.41, 156.42, 156.47, 156.68, 310/156.71, 15, 12
See application file for complete search history.

(56) References Cited

U.S. PATENT DOCUMENTS

| | | | | |
|---|---|---|---|---|
| 3,303,369 | A | * | 2/1967 | Erickson ..................... 310/168 |
| 5,536,984 | A | * | 7/1996 | Stuart et al. .................. 310/13 |
| 6,653,753 | B1 | * | 11/2003 | Kawano et al. ............... 310/14 |
| 7,122,919 | B2 | * | 10/2006 | Maezawa et al. ............. 310/14 |

* cited by examiner

*Primary Examiner*—Dang Le
(74) *Attorney, Agent, or Firm*—Birch, Stewart, Kolasch & Birch, LLP

(57) ABSTRACT

A reciprocating motor includes a pair of stators and a cylindrical magnet formed as a single body and disposed between the stators, for linearly reciprocating. Accordingly, it allows facilitating a job of manufacturing and installing the magnet, so that productivity can be improved.

15 Claims, 5 Drawing Sheets

RECIPROCATING MOTOR

BACKGROUND OF THE INVENTION

1. Field of the Invention

The present invention relates to a reciprocating motor, and more particularly, to a reciprocating motor which enables to improve productivity and assembling of a magnet.

2. Description of the Background Art

In general, a reciprocating motor has a magnetic flux in a plane form, and a movable unit disposed between an outer stator and an inner stator linearly reciprocates according to variation of the magnetic flux.

As shown in FIGS. 1 and 2, the conventional reciprocating motor includes an outer stator 11 having a cylindrical shape by radially stacking a plurality of lamination sheets 14 to an outer side of a winding coil 15, an inner stator 12 disposed in an inner circumference of the outer stator 11 at a certain air gap from an inner circumferential surface of the outer stator 11 and having a cylindrical shape by radially stacking a plurality of lamination sheets 13, and a movable unit 20 disposed between the outer stator 11 and the inner stator 12 and linearly reciprocating.

The movable unit 20 includes a magnet frame 21 disposed between the outer stator 11 and the inner stator 12, a plurality of magnets 22 installed along the circumference of the magnet frame 21, and a retainer ring 23 for fixing the magnets 22 on the magnet frame 21.

As shown in FIG. 3, the magnet frame 21 is formed as a cylindrical shape and made of stainless steel (SUS)-based materials. A plurality of grooves 21a having a predetermined depth are respectively recessed along an outer circumference of the magnet frame 21 so as to mount the magnets 21a therein.

The retainer ring 23 is made of thin metallic materials, and compresses each of outer circumferences of a plurality of magnets 22 to thereby fix a plurality of magnets 22 on an outer circumferential surface of the magnet frame 21. In addition, a plurality of slits 23a for interrupting an eddy current are formed at the outer circumferential surface of the retainer ring 23.

The movable unit 20 is assembled as follows. While a plurality of magnets 22 are being adhered to the grooves 21a recessed in the outer circumferential surface of the magnet frame 21 by an adhesive, each of them is insertedly fixed to the grooves 21a. Then, the retainer ring 23 is inserted to encompass the outer circumference of the magnets 22, and both ends of the retainer ring 23 are bent to fix the magnets 22.

In the conventional reciprocating motor, when an external power is applied to the winding coil 15, magnetic flux is formed around the winding coil 15. The flux forms a kind of closed loop by flowing to the inner stator 12 along one path of the outer stator 11 and flowing to another path of the outer stator 11. And, as the magnets 22 are pushed and pulled according to a direction of the flux, the magnet frame 21 linearly reciprocates.

However, in the conventional reciprocating motor, because a plurality of the magnets 22 should be separately installed at the magnet frame 21 after they are individually fabricated, the assembly process of the magnets 22 is complicated, thereby lowering productivity of products.

In addition, in order to maintain regular intervals between a plurality of magnets 22 attached to the magnet frame 21, the magnets 22 are fixed via the retainer ring 23. Therefore, the number of parts is increased because of the use of the retainer ring 23 to thereby increase a manufacturing cost and complicate the assembly process.

SUMMARY OF THE INVENTION

Therefore, an object of the present invention is to provide a reciprocating motor capable of improving productivity of a product and reducing the cost by integrally manufacturing a magnet in a cylindrical shape and simplifying the manufacturing process of the magnet and the assembly process of the magnet.

To achieve these and other advantages and in accordance with the purpose of the present invention, as embodied and broadly described herein, there is provided a reciprocating motor, comprising a pair of stators, and a cylindrical magnet formed as a single body and disposed between the stators, for linearly reciprocating, wherein the magnet is integrally formed in a cylindrical shape.

In addition, at least one slit for interrupting an eddy current is formed at an outer circumference of the magnet in a direction that the magnet linearly reciprocates.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Hereinafter, reference will now be made in detail to the preferred embodiments of the present invention, examples of which are illustrated in the accompanying drawings.

Figure 1:
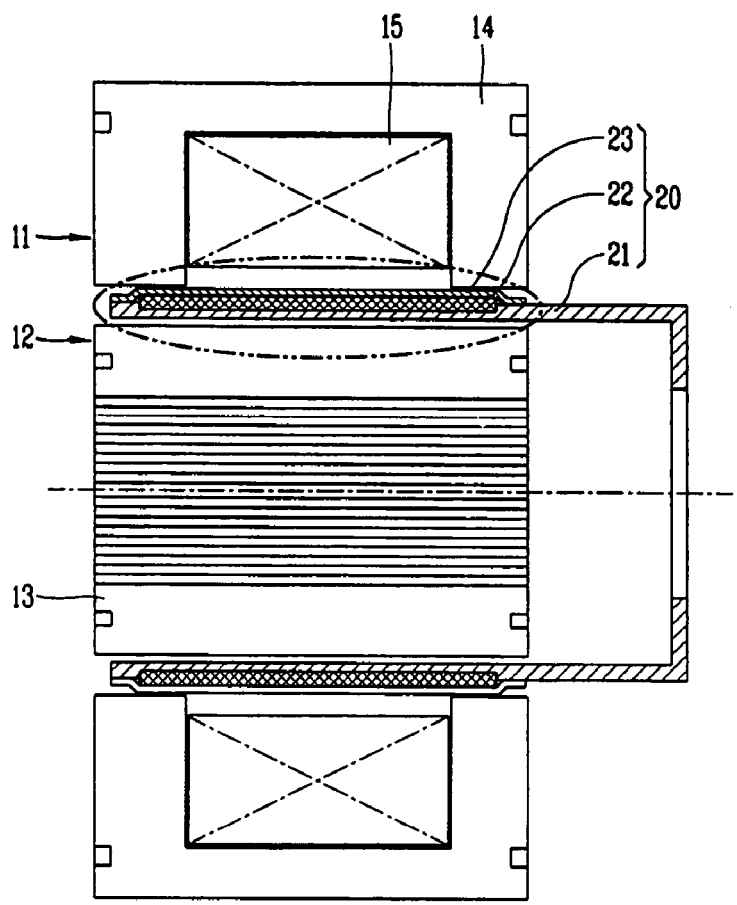
FIG. 1 is a sectional view showing the conventional reciprocating motor.
Figure 2:
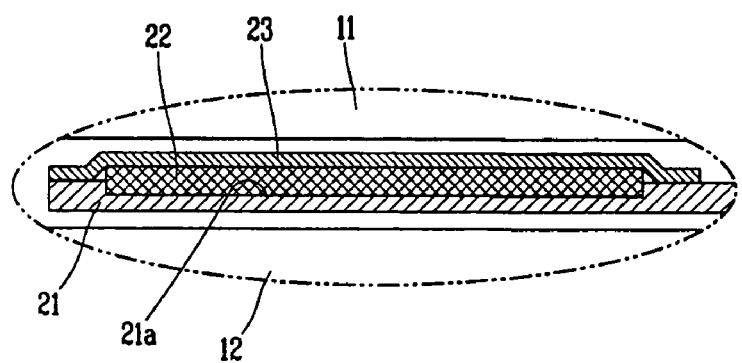
FIG. 2 is an enlarged sectional view showing a movable unit of the reciprocating motor of FIG. 1.
Figure 3:
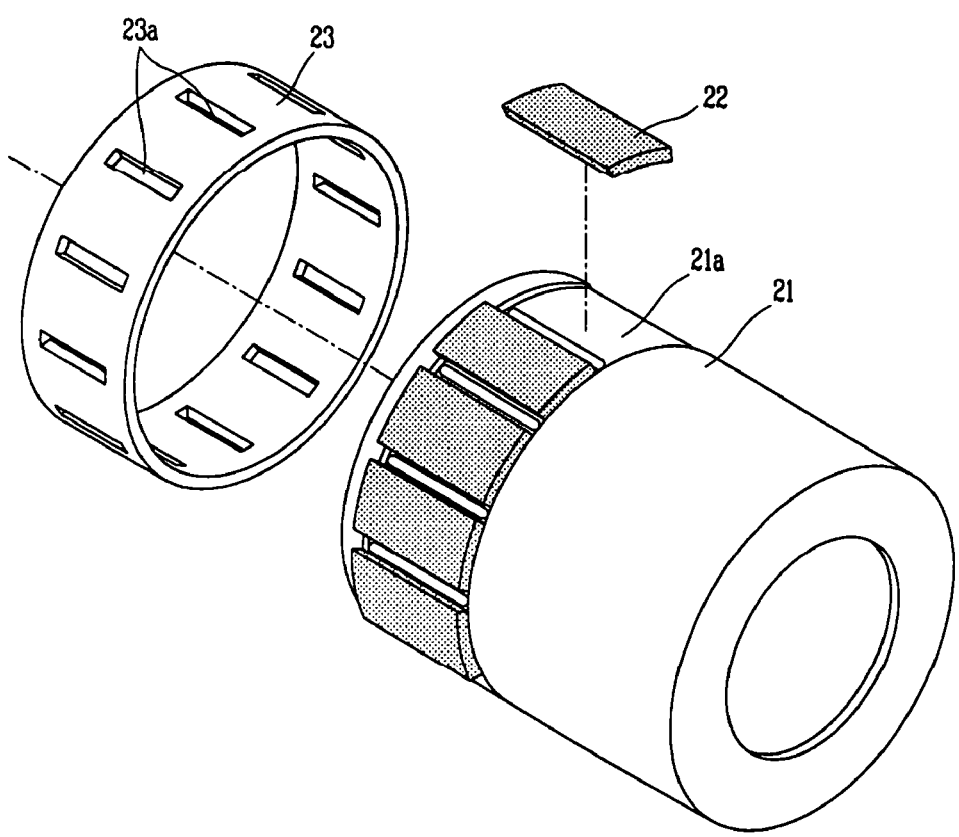
FIG. 3 is an exploded perspective view showing the movable unit of the reciprocating motor of FIG. 1.
Figure 4:
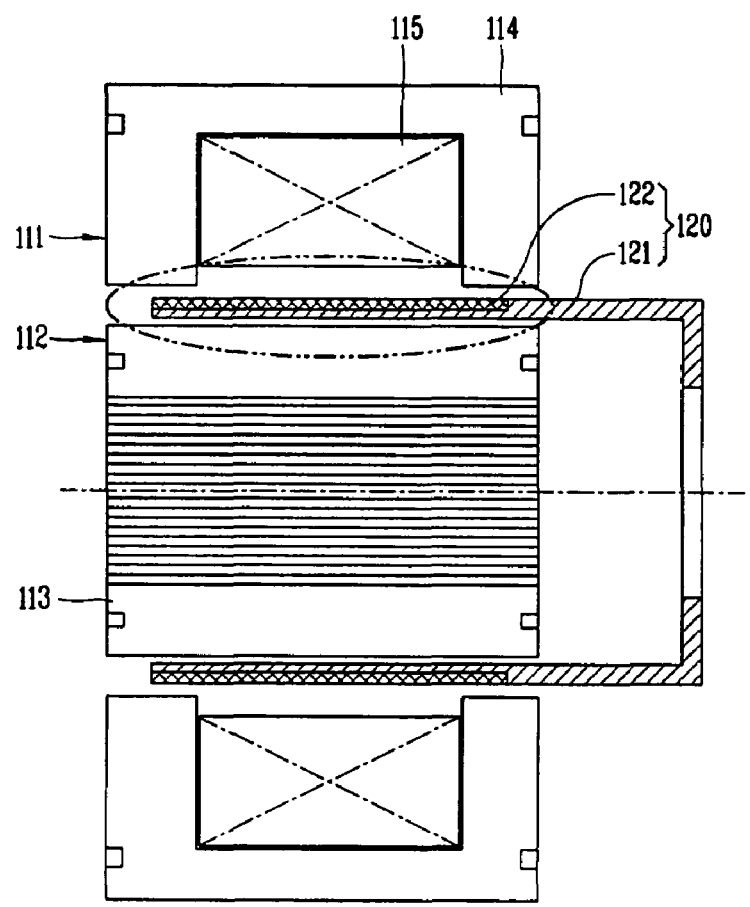
FIG. 4 is a sectional view showing a reciprocating motor in accordance with one embodiment of the present invention.
Figure 5:
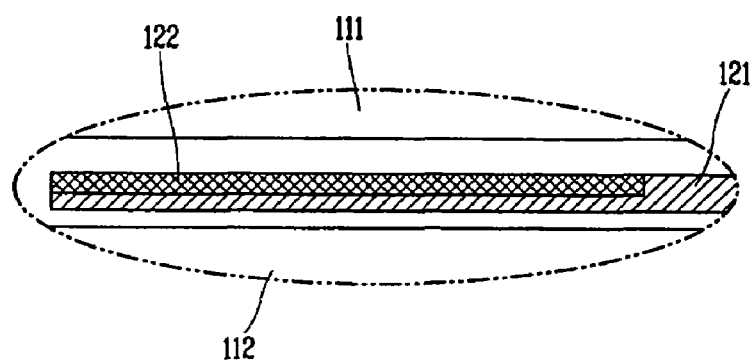
FIG. 5 is an enlarged sectional view showing a movable unit of the reciprocating motor of FIG. 4.

As shown in FIGS. 4 and 5, a reciprocating motor in accordance with the present invention includes an outer stator 111 having a cylindrical shape by radially stacking a plurality of lamination sheets 114 on an outer side of a winding coil 115, an inner stator 112 disposed in an inner circumference of the outer stator 111 at a certain air gap from an inner circumferential surface of the outer stator 111 and having a cylindrical shape by radially stacking a plurality of lamination sheets 113, and a movable unit 120 disposed between the outer stator 111 and the inner stator 112 and linearly reciprocating.

Figure 6:
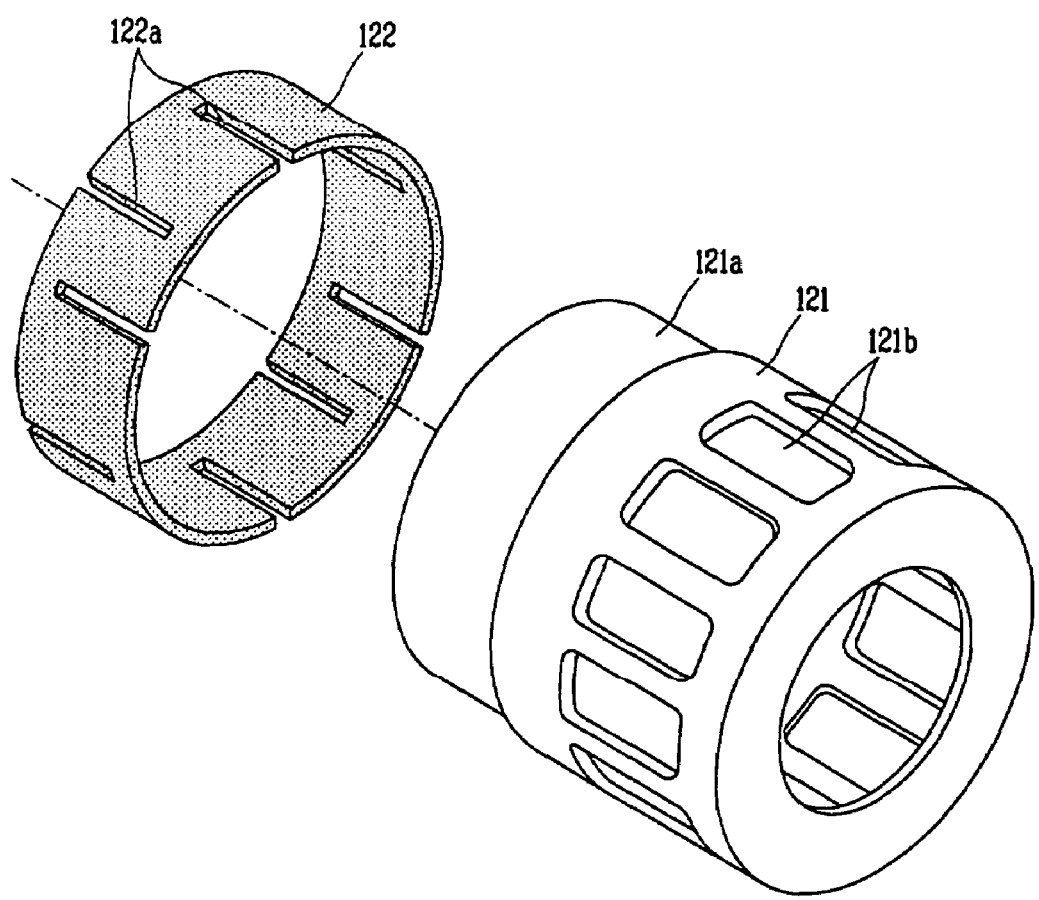
FIG. 6 is an exploded perspective view showing the movable unit of the reciprocating motor of FIG. 4.

As shown in FIG. 6, the movable unit 120 includes a magnet frame 121 disposed between the outer stator 111 and the inner stator 112, and a cylindrical magnet 122 formed as a single body and installed on an outer circumferential surface of the magnet frame 121.

The magnet frame 121 is formed in a cylindrical shape, and a cylindrical groove 121a having a predetermined depth are recessed along an outer circumference of the magnet frame 121 so as to mount the magnet 122 therein. In addition, a plurality of through holes 121b are preferably formed around the magnet frame 121 to reduce resistance generated during the movement of the magnet frame 121.

The magnet 122 is insertedly fixed in the groove 121a, and the magnet 122 can be more stably fixed to the groove 121a by interposing an adhesive between the magnet 122 and the groove 121a.

An inner diameter of the magnet 122 is formed to be substantially identical to an outer diameter of the groove 121a, which is advantageous in stably insertedly fixing the magnet 122 in the groove 121a. In this case, the magnet 122 is preferably formed with an elastic material.

Meanwhile, at least one slit 122a is formed in the outer circumference of the magnet 122 in an axial direction of the magnet 122, i.e. in a direction that the assembly of the magnet frame 121 and the magnet 122 linearly reciprocate, in order to interrupt an eddy current. A length of the slit 122a is shorter than a width of the magnet 122 in the direction that the magnet 122 linearly reciprocates, and a plurality of slits are preferably formed in a circumferential direction of the magnet 122 at the same intervals.

The slits 122a are opened toward one side facing the magnet frame 121 and toward another side opposite to one side facing the magnet frame 121, respectively. Here, the slits opened to one side of the magnet 122 and the slits opened to another side of the magnet 122 are alternately formed, which is an effective way to maintain the intensity of the magnet 122.

Figure 7:
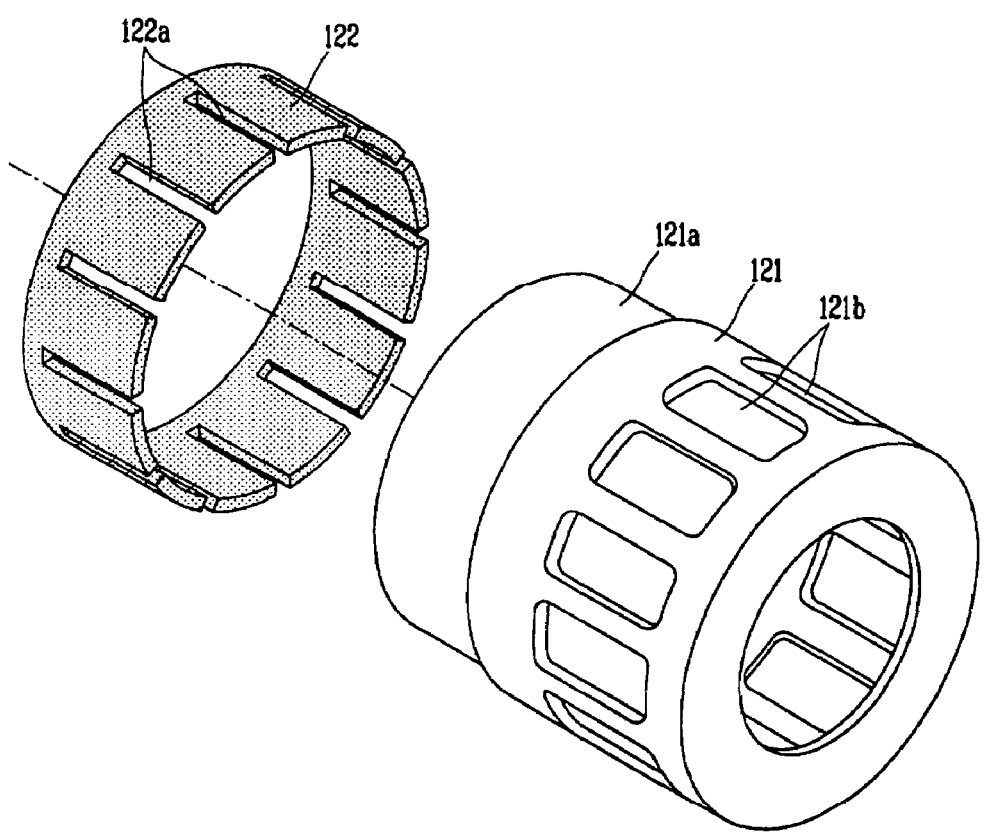
FIG. 7 is an exploded perspective view showing a movable unit of a reciprocating motor in accordance with another embodiment of the present invention.

However, not limited to such construction, as shown in FIG. 7, all of the slits 122a can be opened toward one side facing the magnet frame 121 or toward another side opposite to one side facing the magnet frame 121. In this case, in order to insertedly fix the magnet 122 to the magnet frame 121a easily, the slits 122a are preferably opened toward the direction facing the magnet frame 121.

In the reciprocating motor having such construction in accordance with the present invention, the assembly of the movable unit 120 is completed by simply insertedly fixing the cylindrical magnet 122 to the magnet frame 121.

At this time, since the magnet frame 121 is provided with the groove 121a, the cylindrical magnet 122 is inserted upon the groove 121a to be firmly fixed to the groove.

In addition, since the slits 122a are formed on the outer circumference of the magnet 122, when the magnet 122 is installed at the magnet frame 121, the slits 122a are spread to a certain degree. Therefore, the magnet 122 can be easily mounted at the magnet frame 121.

In the reciprocating motor in accordance with the present invention, when an external power is applied to the winding coil 115, magnetic flux is formed around the winding coil 115. The flux flows forms a kind of closed loop by flowing to the inner stator 112 along one path of the outer stator 111 and flowing to another path of the outer stator 111. And, as the magnet 122 of the movable unit 120 is pushed and pulled according to a direction of the flux, the magnet 122 linearly reciprocates. At this time, the eddy current is generated in the magnet 122, but such eddy current is interrupted by the silts 122a formed at the magnet 122. Therefore, a loss caused by the eddy current is prevented.

In the reciprocating motor in accordance with the present invention, because a cylindrical magnet formed as a single body is inserted upon a cylindrical magnet frame, in comparison to the conventional reciprocating motor in which a plurality of magnets are individually fabricated and separately fixed into an outer circumference of a magnet frame, the manufacturing process of the magnet and the assembly process of the magnet are simple, thereby improving productivity.

In addition, the reciprocating motor in accordance with the present invention is provided with the cylindrical magnet formed in a single body. Accordingly, a separate part for fixing magnets to a magnet frame such as a retainer ring of the conventional art is unnecessary, so that the production cost can be reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A reciprocating motor, comprising:
   a pair of stators; and
   a cylindrical magnet formed as a single body and disposed between the stators, for linearly reciprocating along a first direction, at least one slit being located at an outer circumference of the magnet, the at least one slit being substantially parallel to the first direction to interrupt an eddy current at the outer circumference of the magnet in the first direction.

2. The reciprocating motor of claim 1, wherein a length of the at least one slit is shorter than a width of the magnet in the first direction.

3. The reciprocating motor of claim 2, wherein the magnet has a plurality of slits, each of the slits having an open end at either a first end or a second end of the magnet, the second end of the magnet being opposite to the first end of the magnet.

4. The reciprocating motor of claim 3, wherein the slits having the open end at the first end of the magnet and the slits having the open end at the second end of the magnet are alternately formed.

5. The reciprocating motor of claim 4, wherein the slits are located in a circumferential direction of the magnet at the same intervals.

6. The reciprocating motor of claim 2, wherein the magnet has a plurality of slits and each of the slits has an open end at a first end of the magnet.

7. The reciprocating motor of claim 6, wherein the slits are formed in a circumferential direction of the magnet at the same intervals.

8. The reciprocating motor of claim 1, comprising:
   a frame on which the magnet is mounted, disposed between the stators, and linearly reciprocating with the magnet,
   wherein the frame has a cylindrical groove in which the magnet is inserted and the cylindrical groove extends from an end of the frame in the first direction.

9. The reciprocating motor of claim 8, wherein the magnet has a plurality of slits that are formed in a circumferential direction of the magnet at the same intervals.

10. The reciprocating motor of claim 8, wherein the magnet has a plurality of slits, and at least one of the slits has an open end toward the frame.

11. The reciprocating motor of claim 10, wherein the slits are formed in a circumferential direction of the magnet at the same intervals.

12. The reciprocating motor of claim 8, wherein the magnet has a plurality of slits, each of the slits having an open end at either a first end or a second end of the magnet, the second end of the magnet being opposite to the first end of the magnet.

13. The reciprocating motor of claim 12, wherein the slits having the open end at the first end of the magnet and the slits having the open end at the second end of the magnet are alternately formed.

14. The reciprocating motor of claim 13, wherein the slits are formed in a circumferential direction of the magnet at the same intervals.

15. The reciprocating motor of claim 8, wherein a plurality of through holes are formed in a circumference of the frame.

* * * * *